United States Patent
Foster et al.

(10) Patent No.: US 8,200,050 B2
(45) Date of Patent: Jun. 12, 2012

(54) OPTO-ACOUSTIC PRESSURE SENSOR

(75) Inventors: Scott Foster, Edinburgh (AU); John van Velzen, Edinburgh (AU); Alexei Tikhomirov, Edinburgh (AU); Francois Luc, Rydalmere (AU); Ian Bedwell, Rydalmere (AU)

(73) Assignees: The Commonwealth of Australia, Edinburgh (AU); Thales Underwater Systems Pty Ltd, Rydalmere (AU)

( * ) Notice: Subject to any disclaimer, the term of this patent is extended or adjusted under 35 U.S.C. 154(b) by 379 days.

(21) Appl. No.: 11/663,970

(22) PCT Filed: Sep. 28, 2005

(86) PCT No.: PCT/AU2005/001481
§ 371 (c)(1),
(2), (4) Date: Oct. 10, 2007

(87) PCT Pub. No.: WO2006/034538
PCT Pub. Date: Apr. 6, 2006

(65) Prior Publication Data
US 2009/0180730 A1    Jul. 16, 2009

(30) Foreign Application Priority Data
Sep. 28, 2004   (AU) ................ 2004905573

(51) Int. Cl.
G02B 6/00     (2006.01)
G02B 6/34     (2006.01)
(52) U.S. Cl. ............................ 385/13; 385/37
(58) Field of Classification Search ........... 385/13
See application file for complete search history.

(56) References Cited

U.S. PATENT DOCUMENTS

| | | | |
|---|---|---|---|
| 4,294,513 A * | 10/1981 | Nelson et al. ............. | 385/4 |
| 5,771,251 A | 6/1998 | Kringlebotn et al. | |
| 5,867,258 A | 2/1999 | Frederick et al. | |
| 6,233,374 B1 | 5/2001 | Ogle et al. | |
| 6,278,811 B1 | 8/2001 | Hay et al. | |
| 6,289,740 B1 | 9/2001 | Posey, Jr. et al. | |
| 6,295,304 B1 | 9/2001 | Koch et al. | |
| 6,422,084 B1 * | 7/2002 | Fernald et al. ............. | 73/705 |
| 6,496,264 B1 | 12/2002 | Goldner et al. | |
| 6,522,797 B1 | 2/2003 | Siems et al. | |
| 6,778,735 B2 * | 8/2004 | Miller et al. ............... | 385/37 |
| 6,998,599 B2 * | 2/2006 | Lagakos et al. ............ | 250/227.16 |
| 2005/0051022 A1 | 3/2005 | Hodder et al. | |
| 2007/0183464 A1 * | 8/2007 | Poulsen et al. ............. | 372/6 |

FOREIGN PATENT DOCUMENTS

| | | |
|---|---|---|
| FR | 2 618 549 | 1/1989 |
| GB | 2 242 518 | 10/1991 |
| GB | 2 384 108 | 7/2003 |
| GB | 2 407 154 | 4/2005 |

* cited by examiner

Primary Examiner — Omar Rojas
(74) Attorney, Agent, or Firm — McDermott Will & Emery LLP

(57) ABSTRACT

A device (10) for sensing an acoustic signal is described. The device includes a flexible portion (14) including a laser active region (13) whose emitted wavelength varies according to a mechanical force acting on the flexible portion (14) and a flexible support member (24) operable to flex or bend according to the acoustic signal. The flexible portion (14) is coupled with the support member (24) so as to cause the flexible portion to flex or bend in accordance with the support member (24) thereby changing the emitted wavelength of the laser active region (13) of the flexible portion (14).

8 Claims, 3 Drawing Sheets

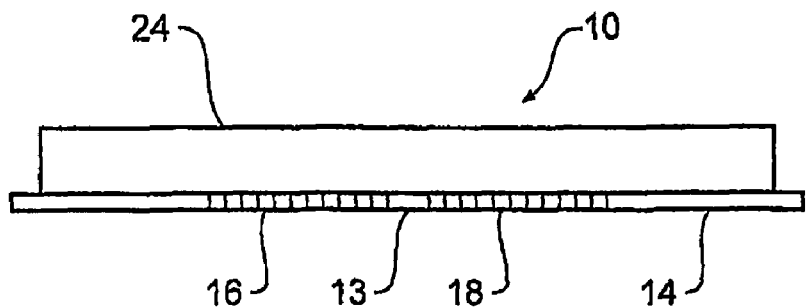
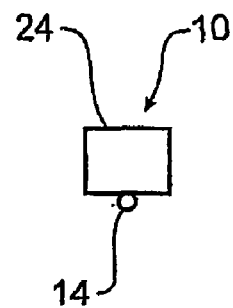
Fig 1
Fig 2
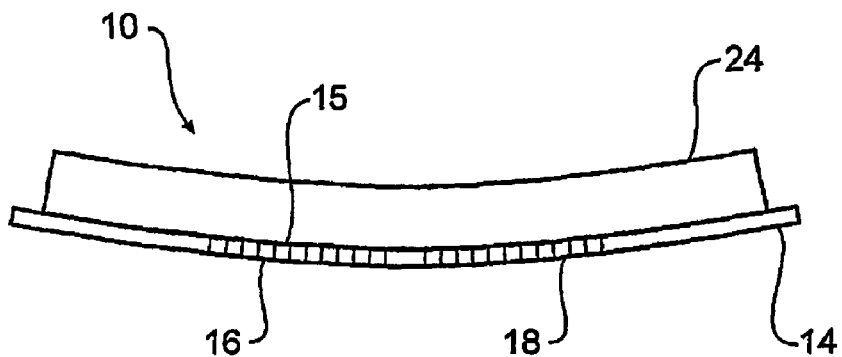
Fig 3
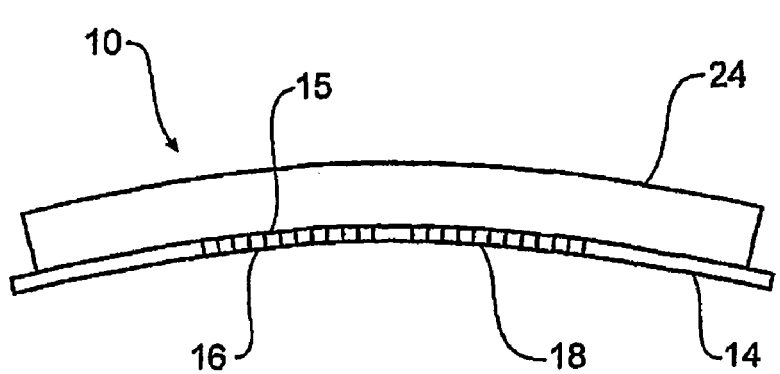
Fig 4

OPTO-ACOUSTIC PRESSURE SENSOR

CROSS-REFERENCES TO RELATED APPLICATIONS

The present application is the National Stage of International Application No. PCT/AU2005/001481, filed on Sep. 28, 2005, and claims the benefit of priority of Australian Patent Application No. 2004905573, filed on Sep. 28, 2004.

FIELD OF THE INVENTION

The present invention relates to a sensor for the detection of an acoustic signal. In a particular form the invention relates to a passive acoustic sensor suitable for deployment in an underwater environment as a hydrophone.

BACKGROUND OF THE INVENTION

Acoustic sensors are largely based upon electronic piezoelectric devices where deformation of the piezoelectric material results in a voltage change which can be measured using suitable electronics. However, these devices require essentially local instrumentation which is a disadvantage for remote sensing applications such as hydrophones deployed in underwater arrays and results in sensors which are bulkier and more complex tan desired. This is due to the data and power cabling and pre-amp requirements which make hydrophone arrays of this nature difficult to deploy and maintain. Some other disadvantages with piezoelectric based devices include their susceptibility to electromagnetic interference thereby reducing their overall sensitivity and the fact that due to their active electronics they may be detected by other parties.

To this end there have been a number of attempts to develop acoustic sensors based on fibre optic technology (see for example C K Kirkendall and A Dandridge, "Overview of High Performance Fibre-Optic Sensing", J. Phys. D: Appl. Phys. 37, R197-R216, 2004). One attempt employs a distributed feedback fibre laser (DFB FL) whose characteristics include a very narrow lasing wavelength output and the ability to be configured to operate at different wavelengths, making them suitable for wavelength division multiplexing (see for example D J Hill, P J Nash, D A Jackson, D J Webb, S F O'Neill, I Bennion and I Zhang, "A Fibre Laser Hydrophone Array", Proc. SPIE, 3860, 55-66, 1999).

These sensors are based on an important feature of these lasers in that the frequency (or equivalently wavelength) of laser light emitted is sensitive to the induced stain on the fibre. This is understood to arise from changes in the resonant cavity size of the fibre laser and additionally the refractive index of the fibre in those regions which are under strain. However, whilst these devices offer a number of advantages over electronic based devices due to the lack of electronic instrumentation required at the "wet end" and furthermore the ability to multiplex a number of sensors in a single fibre, they have been found to be insufficiently sensitive for a number of hydrophone type applications of interest. Also, they have been found to be inherently sensitive to non-acoustic vibrations making them unacceptably noisy for many applications.

Some attempts to increase the sensitivity of a distributed feedback fibre laser include encapsulating the fibre in a cylinder of epoxy or polyurethane thereby forming a mandrel surrounding the laser active region of the fibre laser. Whilst the increased bulk of the fibre surrounding the cavity and associated regions of the distributed feedback fibre laser improves the strain to pressure sensitivity somewhat it is still insufficient for those applications where extreme sensitivity is required such as a hydrophone. In addition, distributed feedback fibre lasers which have been modified in this manner suffer from overall lower resonant frequencies due to the increased mass of encapsulating material that is used to increase the strain to pressure sensitivity.

There have also been attempts in the prior art to enhance sensitivity by attaching the two ends of the fibre laser to a mechanical structure so that the fibre is under tension similar to a guitar string. This structure is configured to elongate or compress in response to pressure changes, thereby straining the fibre. These devices only address the issue of enhanced pressure sensitivity and do not solve the equally important problem of inherent vibrational noise sensitivity and in fact in some circumstances they function to increase noise sensitivity.

It is an object of the present invention to provide an acoustic sensor based on fibre optic laser technology suitable for deployment as a hydrophone.

SUMMARY OF THE INVENTION

In a first aspect the present invention accordingly provides a device for sensing an acoustic signal, said device including:
 a flexible portion, said flexible portion including a laser active region whose emitted wavelength varies according to a mechanical force acting on said flexible portion; and
 a flexible support member, said support member operable to flex or bend according to said acoustic signal, wherein said flexible portion is coupled with said support member to cause said flexible portion to flex or bend in accordance with said support member thereby changing the emitted wavelength of said laser active region of said flexible portion.

As the flexible support member effectively amplifies the effect of the acoustic signal by directly causing the flexible portion to flex, this results in an acoustic sensor of greater sensitivity.

Preferably, said flexible portion includes an elongate flexible fibre including said laser active region, said elongate flexible fibre attached to said support member to cause said elongate fibre to flex or bend in accordance with said support member.

As the flexible support member causes the fibre to flex with its axis offset from the neutral bend axis, this effectively magnifies the effect of any bending of the support member on the fibre. In addition, as a fibre is naturally prone to flex, bending and flexing the fibre in this manner will not unduly damage the fibre yet still results in measurable changes in the wavelength emitted from the laser active region.

Preferably, said elongate flexible fibre is attached to said support member to cause said elongate flexible fibre to flex or bend with a substantially common radius of curvature to that of the support member.

This is a convenient configuration to adopt as the fibre will bend in a predictable and quantifiable way in relation to the support member.

Preferably, said elongate flexible fibre is attached to said support member over a predetermined length encompassing said laser active region.

Depending on the requirements of the acoustic sensor it may be necessary to attach a length of the fibre directly to the support member.

Optionally, said elongate flexible fibre is attached to said support member at at least two discrete points along said fibre.

By attaching the fibre to at least two discrete points along the support member, the fibre may be caused to flex or bend in those circumstances where attaching the fibre along a length of the fibre is not required.

Preferably, said support member is elongate and substantially aligned with said elongate fibre.

In a second aspect the present invention accordingly provides a device for sensing an acoustic signal, said device including:
an elongate flexible fibre, said flexible fibre including a laser active region whose emitted wavelength varies according to a mechanical force acting on said fibre;
a flexible support member, said support member operable to flex or bend, wherein said elongate flexible fibre is attached to said support member to cause said elongate fibre to flex or bend sympathetically with said support member thereby changing the emitted wavelength of said laser active region of said fibre; and
force imparting means to impart force and to cause bending or flexing of said flexible member in accordance with said acoustic signal.

In this aspect the force imparting means cause the flexible member to bend in accordance with the acoustic signal. By separating the force imparting means from the flexible member, the force imparting means can be designed to be sensitive to only acoustic pressure and not to other physical effects such as bulk accelerations which could potentially impact the sensitivity of the sensor.

BRIEF DESCRIPTION OF THE DRAWINGS

A preferred embodiment of the present invention will be discussed with reference to the accompanying drawings wherein:

FIG. 1 is a side-on figurative view of an acoustic sensor according to a first embodiment of the present invention;

FIG. 2 is an end-on view of the acoustic sensor illustrated in FIG. 1;

FIG. 3 is a side-on view of the acoustic sensor illustrated in FIG. 1 depicting the change in configuration of the distributed feedback fibre laser due to convex bending of the support member relative to the fibre;

FIG. 4 is a side-on view of the acoustic sensor illustrated in FIG. 1 depicting the change in configuration of the distributed feedback fibre laser due to concave bending of the support member relative to the fibre;

In the following description, like reference characters designate like or corresponding parts throughout the several views of the drawings.

DESCRIPTION OF PREFERRED EMBODIMENT

Figure 5:
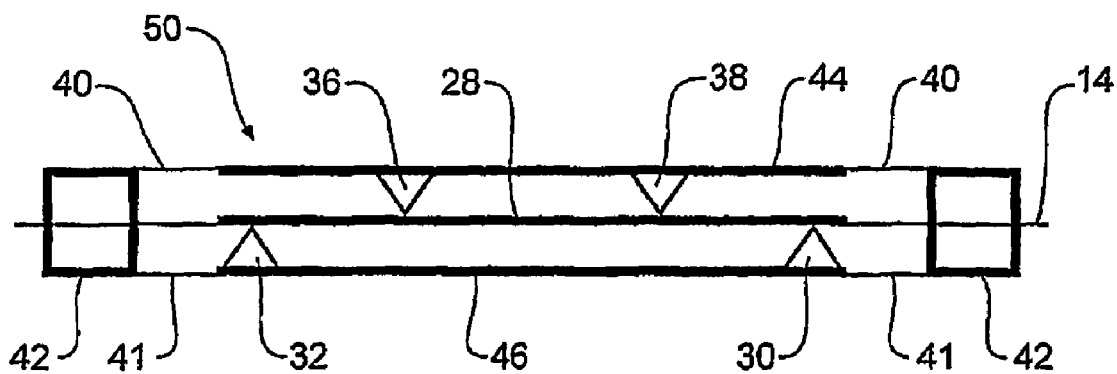
FIG. 5 is a side-on figurative view of an acoustic sensor according to a second embodiment of the present invention.

Referring now to FIGS. 1 and 2, there are shown respective side and end-on views of an acoustic sensor 10 according to a first embodiment of the present invention. Acoustic sensor 10 includes a distributed feedback fibre laser 14 incorporating a central active cavity or lasing region 13 and Bragg grating elements 16, 18 also located in the gain medium located on opposed sides of cavity 13. The combined effect of the Bragg grating elements 16, 18 is to cause emission of laser light having a wavelength defined by the structure of the central active cavity or lasing region 13. In this embodiment the fibre core is impregnated with Erbium ions which act as the active gain medium and pumping energy is supplied by way of 980 nm (or 1480 nm) pumping radiation.

Fibre laser 14 is attached along its length to an elongate flexible beam constructed from aluminium having dimensions of 53 mm (L)×1 mm (T)×2 mm (W). The precise dimensions and material properties of the beam will depend on a wide range of considerations including the range of acoustic wavelengths to be detected and the sensitivity that is to be achieved. Whilst in this embodiment, a prismatic aluminium beam is used, it would be clear to those skilled in the art that a general support member which flexes or bends in response to an acoustic signal would be equally applicable to the invention. Thus, there is no particular requirement that the support member be elongate and aligned with the fibre.

Referring now to FIGS. 3 and 4, there is shown acoustic sensor 10 in operation. As fibre laser 14 is attached along its length to one side of flexible beam 24 by glue or alternatively a suitably viscous material such as grease or the like, any flexing or bending of beam 24 due to acoustic pressure will cause fibre laser 14 to flex or bend in accordance with the beam 24. In FIG. 3, fibre laser 14 is depicted attached to the convex side 15 of beam 24 as it undergoes bending. Fibre laser 14 will be brought into increased strain as the radius of curvature of bending of beam 24 decreases. Turning now to FIG. 4, the fibre laser 14 is depicted attached to the concave side 15 of flexible beam 24 as it undergoes bending. Clearly, fibre laser 14 will be increasingly compressed as the radius of curvature of bending of beam 24 decreases. To ensure that the fibre laser 14 bends in accordance with the beam it can be attached to beam 24 in an already pre-tensioned state.

As would be apparent to those skilled in the art, in operation acoustic sensor 10 will be configured to be supported in such a way that the support member will flex under the influence of acoustic pressure. One illustrative mounting configuration includes a cube shaped support having five rigid sides and a sixth flexible side forming a diaphragm sensitive to acoustic pressure. The support member is then suitably mounted on the diaphragm. Whilst in this embodiment fibre laser 14 is attached to a planar surface of flexible beam 24, clearly the invention can be applied to support members which may include a curved or irregular support surface to which the fibre laser 14 is attached. In addition, whilst in this first embodiment the fibre laser 14 is attached along its entire length to beam 24, equally the fibre laser 14 may be attached at discrete attachment points, the only requirement being that the fibre laser 14 bend or flex sympathetically with the beam 24.

Clearly, the use of a distributed feedback fibre laser provides a convenient embodiment of a laser active region whose emission wavelength is sensitive to the physical environment. However, other flexible portions or members that include a laser active region are contemplated to be within the scope of the invention.

One example includes depositing directly upon the support member a layer of optical material such as silica so as to have a predetermined non-uniform refractive index and/or other optical characteristics to form an optical waveguide that includes a Bragg grating. A portion of the waveguide coincident with the Bragg grating is then made optically active by the addition of rare earth ions to the medium thereby forming a laser active region. Beam light can then be coupled into or out of the waveguide via an optical fibre connection at one or both of the ends of the flexible silica layer. When optical pump power is supplied via this optical end coupling, a distributed feedback laser will be formed in the laser active region of the waveguide with flexing or bending of the support member causing the associated laser wavelength to change according to the present invention.

As would be apparent to those skilled in the art, acoustic sensor 10 is particularly suitable for deployment as a hydrophone due to its increased pressure sensitivity. Acoustic sensor 10 may be integrated into a wavelength division multiplexed system incorporating multiple sensors each lasing at discrete wavelengths as is known in the art. Changes in each of these wavelengths will indicate the presence of an acoustic signal at an associated sensor thereby providing a hydrophone array having increased sensitivity when compared to those of the prior art.

Figure 6:
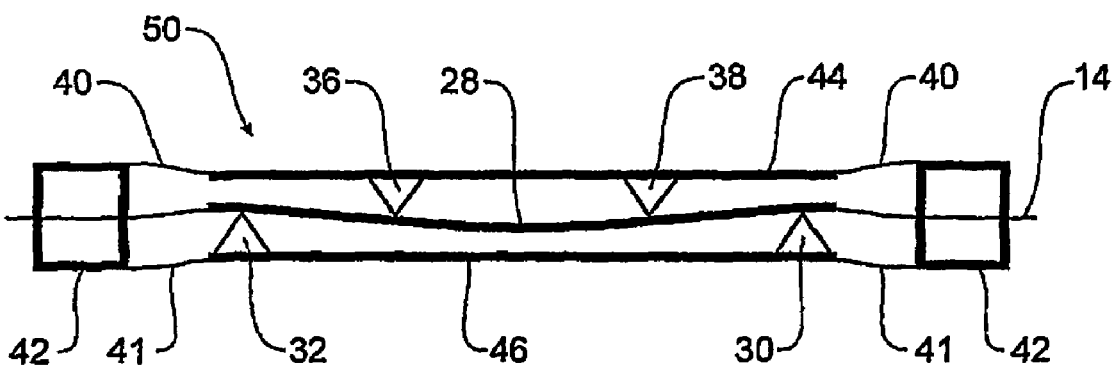
FIG. 6 is a side-on figurative view of the acoustic sensor illustrated in FIG. 5 depicting the effect of acoustic pressure.
Figure 7:
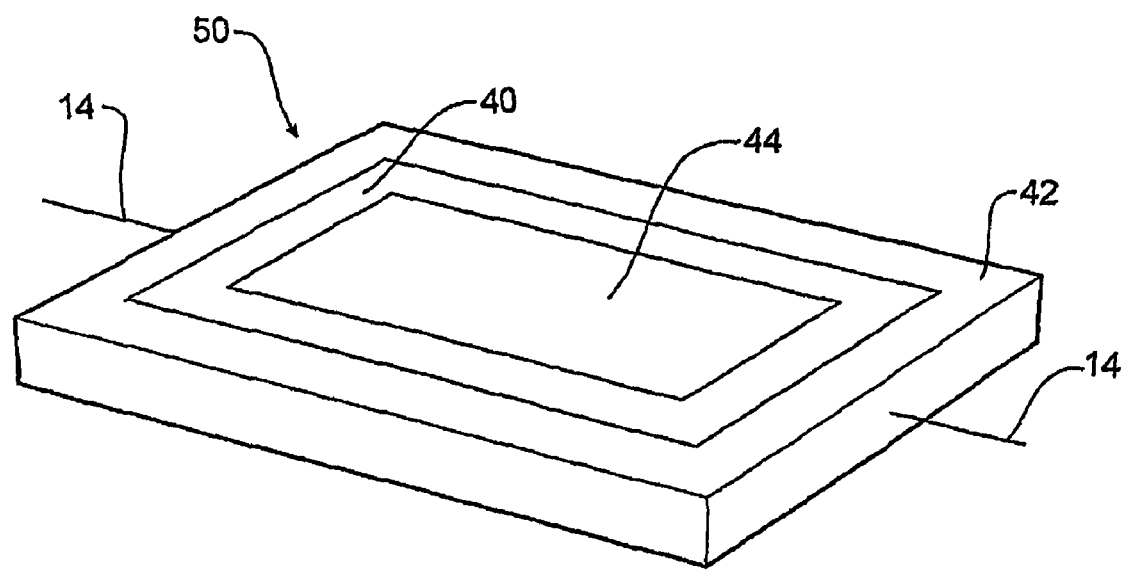
FIG. 7 is a perspective view of the acoustic sensor illustrated in FIG. 5.

Often hydrophones are required to be deployed in a moving or towed array configuration with the resulting acoustic sensor being subject to various bulk accelerations which will be detected as noise. Referring now to FIGS. 5, 6 and 7, there is shown an acoustic sensor 50 according to a second embodiment of the present invention suitable for incorporation into a system that encounters bulk accelerations. Acoustic sensor 50 incorporates a pair of opposed diaphragm or web elements 44, 46 arranged either side of flexible support member 28.

Top diaphragm 44 includes a pair of inner fulcrum or pivot points 36, 38 which abut the top surface of support member 28 and are arranged on opposed sides of the cavity region of fibre laser 14. Bottom diaphragm 46 includes a pair of outer fulcrum or pivot points 32, 30 which abut bottom surface of support member 28 at locations closer to the edges of support member 28. Top and bottom diaphragms 44, 46 are supported at their periphery by top and bottom flexible membranes 40, 41 respectively. Membranes are further attached at their respective outer edges to frame 42. In this manner, top and bottom diaphragms 44, 46 will undergo displacement inwards towards support member 28 under the action of acoustic pressure but will both be commonly accelerated under the action of a bulk acceleration thereby substantially reducing the effect of these accelerations upon the detected acoustic pressure.

As best seen in FIG. 6, acoustic pressure will cause top and bottom diaphragms to move inwardly thereby causing top fulcrum points 36, 38 and bottom fulcrum points 32, 30 to also move together. Due to the arrangement of the four fulcrum points along the support member 28, the flexing or bending of the support member 28 and hence fibre laser 14 is distributed in a predetermined manner. To maximise the effect of wavelength shift and hence the sensitivity of sensor 50 the fulcrum or pivot points 36, 38, 32, 30 are arranged to cause the most flexing or bending of fibre laser 14 in those regions where the optical power of the lasing action is the highest and also to minimise the effect of bulk accelerations. The region of highest optical power is the resonant cavity which typically resides in the central region of fibre laser 14.

Figure 8:
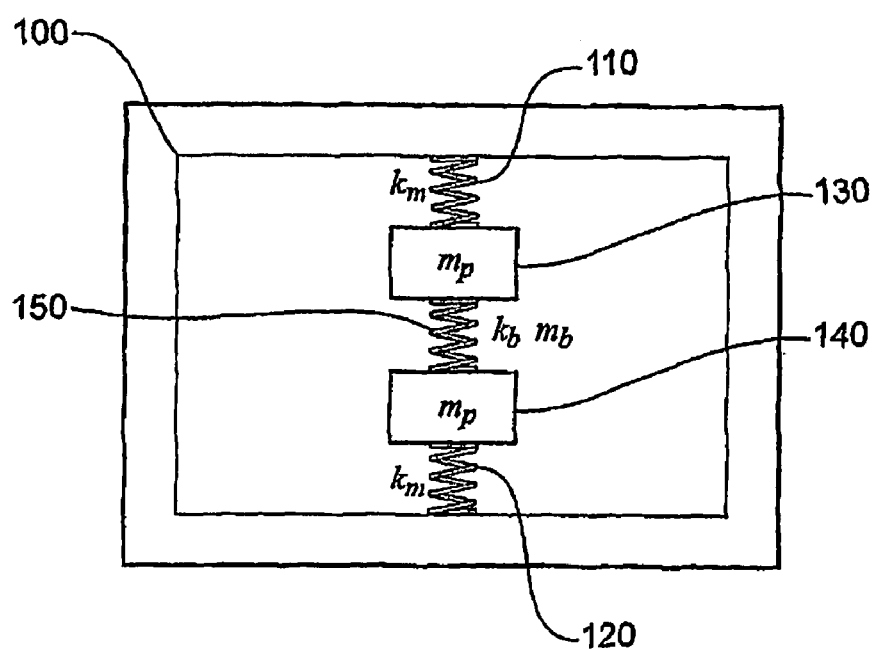
FIG. 8 is a spring mass model of the acoustic sensor that may be adapted to model different embodiments of the present invention.

Referring now to FIG. 8, there is shown a spring mass diagram 100 suitable for modelling a hydrophone design at low frequencies in which strain is induced in a fibre laser by means of flexure of a beam. In this model the flexure of the beam is caused by forces exerted on the beam 150 by a mechanical device in contact with the external pressure environment Each piston 130, 140 that applies force to the beam is assumed to be attached to the outer body by a membrane 110, 120 of effective spring stiffness $k_m$. Each piston 130, 140 is also assumed to have a surface area $A_p$ in contact with the external pressure field. For mechanical purposes, the beam 150 behaves as a (flexural) spring of stiffness $k_b$ and mass $m_b$.

By comparing the force applied to beam 150 by a unit pressure, this being proportional to $$\frac{A_p k_b}{k_b + k_m},$$

to the force that is applied to beam 150 by a unit acceleration, this being directly proportional to $m_b$, the following figure of merit FOM is derived:

$$FOM = \frac{4 A_p k_b}{m_b (k_b + k_m)}$$

The factor of 4 is a geometric gain factor which in this case would apply to the 4 point beam mechanism of acoustic sensor 50. As such, FOM provides a robust measure of the ratio of pressure sensitivity to acceleration sensitivity with higher values representing increased pressure sensitivity.

Accordingly, one illustrative way to configure acoustic sensor 50 includes:
1. ensuring top and bottom diaphragms 44, 46 have substantially equal mass;
2. ensuring top and bottom flexible membranes 40, 41 have substantially equal elastic coefficients (spring constants);
3. ensuring that the elastic coefficients of the beam, the elastic coefficients of the membrane, the mass of the beam and the area of the diaphragm are optimally configured so as to "maximise" FOM;
4. substantially balancing the shear forces and moments imparted on the beam by ensuring that the distance of the outer fulcrum or pivot points 32, 30 from the edge of the support member 28 is substantially equal to the distance of the inner fulcrum or pivot points 36, 38 to the centre of support member 28.

To optimise the beam curvature in relation to the laser mode shape, the following general design principles may also be applied:
1. As the distribution of optical power in a single mode distributed feedback fibre laser is strongly peaked about the centre of the grating and as the sensitivity of laser wavelength to strain is related to the integral of the local strain along the grating weighted by the distribution of optical power according to the following relationship:

$$\Delta\lambda \sim \int strain \times |E|^2 dz$$

where $|E|^2$ is proportional to the optical intensity, then the laser will be most sensitive to strains at the very centre of the grating and virtually insensitive to strains outside of the central 10 to 20% of the device length.

2. In the case of a distributed feedback fibre laser mounted to a flexible support member, the strain in the fibre at any point will be proportional to the local curvature of the support member multiplied by the displacement of the fibre from the central axis of the support member.
3. When the support member is subjected to a set of point loads, as will be the case for the second embodiment of the invention, under the action of pressure or acceleration the curvature of the support member is not uniform along its axis but tends towards maxima at the points of excitation. The applicants here have found in this configuration that the curvature of the support member has its maximum in the centre of the beam, coincident with the centre of the grating where the laser has maximum sensitivity to strain.

4. By modelling the performance characteristics of the laser the curvature of the support member can be designed to be uniform and high across the sensitive region of the laser resulting in optimal pressure sensitivity. Conversely, the applicants here have also found that under pure acceleration the wavelength shift or $\Delta\lambda$ is minimised in the central regions of the support member. Accordingly, by optimising the geometrical configuration of the diaphragm or actuator arrangement with respect to the optical power distribution of the laser, it is possible to reduce the acceleration sensitivity by at least 20 dB compared to sub-optimal configurations.

As would be appreciated by those skilled in the art, sensor 50 can then be incorporated into a moving or towed hydrophone array having the advantages of those systems based on fibre optic technology but also having increased sensitivity. In particular, the present invention may be applied to substantially eliminate the effects of non-acoustic background pressure changes that occur at increased depths.

In this second embodiment, it is found that acoustic sensor 50 is sensitive to acoustic pressures of the order 100 µPa and above, at frequencies below the first acoustic resonance which is at 2500 kHz. This can be compared to an unsupported fibre laser which is sensitive to only pressures above 1000 µPa. Accordingly, the support member 24 can be seen to amplify the effects of acoustic pressure as measured by fibre laser 14 by approximately two orders of magnitude.

Although a preferred embodiment of the present invention has been described in the foregoing detailed description, it will be understood that the invention is not limited to the embodiment disclosed, but is capable of numerous rearrangements, modifications and substitutions without departing from the scope of the invention as set forth and defined by the following claims.

The claims defining the invention are as follows:

1. A device for sensing an acoustic signal, said device comprising:
    an elongate flexible fibre, said flexible fibre including a laser active region whose emitted wavelength varies according to a mechanical force acting on said fibre;
    a flexible support member, said flexible support member operable to flex or bend, wherein said elongate flexible fibre is attached to said flexible support member to cause said elongate fibre to flex or bend with a substantially common radius of curvature to that of said flexible support member thereby changing the emitted wavelength of said laser active region of said fibre; and
    force imparting means to impart force and to cause bending or flexing of said flexible support member in accordance with said acoustic signal.

2. A device for sensing an acoustic signal as claimed in claim 1, wherein said force imparting means includes first and second diaphragm elements mounted on opposed sides of said flexible support member, wherein on displacement of said first and second diaphragm elements due to pressure from said acoustic signal, force is imparted to cause bending or flexing of said flexible support member.

3. A device for sensing an acoustic signal as claimed in claim 2, wherein said first and second diaphragm elements include at least one fulcrum or pivot point arranged on each of said first and second diaphragm elements to cause bending of said flexible support member on displacement of said first and second diaphragm elements.

4. A device for sensing an acoustic signal as claimed in claim 3, wherein said first diaphragm element includes a first inner pair of spaced apart fulcrum or pivot points each located to impart a force to said flexible support member on opposed sides of said laser active region, and wherein said second diaphragm element includes a second outer pair of spaced apart fulcrum or pivot points, each located to impart a force to opposed peripheral regions of said flexible member surrounding said inner pair of spaced apart fulcrum or pivot points.

5. A device for sensing an acoustic signal as claimed in claim 1, wherein said elongate flexible fibre is attached to said flexible support member over a predetermined length encompassing said laser active region.

6. A device for sensing an acoustic signal as claimed in claim 1, wherein said elongate flexible fibre is attached to said flexible support member at least two discrete points along said fibre.

7. A device for sensing an acoustic signal as claimed in claim 1, wherein said flexible support member is elongate and substantially aligned with said elongate flexible fibre.

8. A device for sensing an acoustic signal as claimed in claim 1, wherein said elongate flexible fibre is attached to said flexible support member in a pre-tensioned state.

* * * * *